(No Model.)

J. D. WESTGATE.
FRICTION CLUTCH.

No. 479,684.  Patented July 26, 1892.

Witnesses
Chas. F. Schmelz
Emma Hester.

Inventor
Joseph D. Westgate,
By his Attorney
Rufus B. Fowler.

THE NORRIS PETERS CO., PHOTO-LITHO., WASHINGTON, D. C.

UNITED STATES PATENT OFFICE.

JOSEPH D. WESTGATE, OF WORCESTER, ASSIGNOR OF TWO-THIRDS TO GEORGE ANSON WALKER, OF BOSTON, MASSACHUSETTS.

FRICTION-CLUTCH.

SPECIFICATION forming part of Letters Patent No. 479,684, dated July 26, 1892.

Application filed December 17, 1891. Serial No. 415,382. (No model.)

*To all whom it may concern:*

Be it known that I, JOSEPH D. WESTGATE, a citizen of the United States, residing at Worcester, in the county of Worcester and State of Massachusetts, have invented certain new and useful Improvements in Friction-Clutches, of which the following is a specification, reference being had to the accompanying drawings, representing a friction-clutch embodying my invention and forming a part of this specification, and in which—

Figure 1:
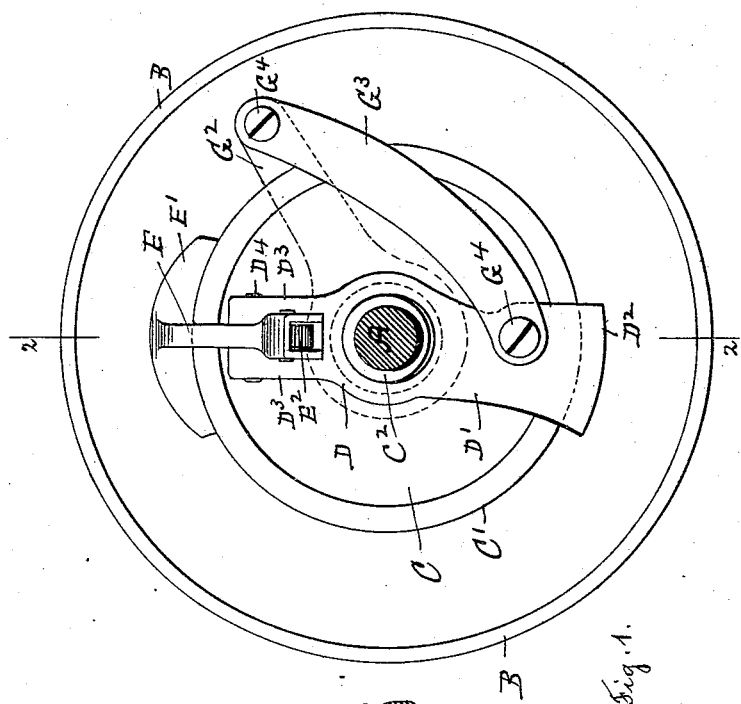
Figure 2:
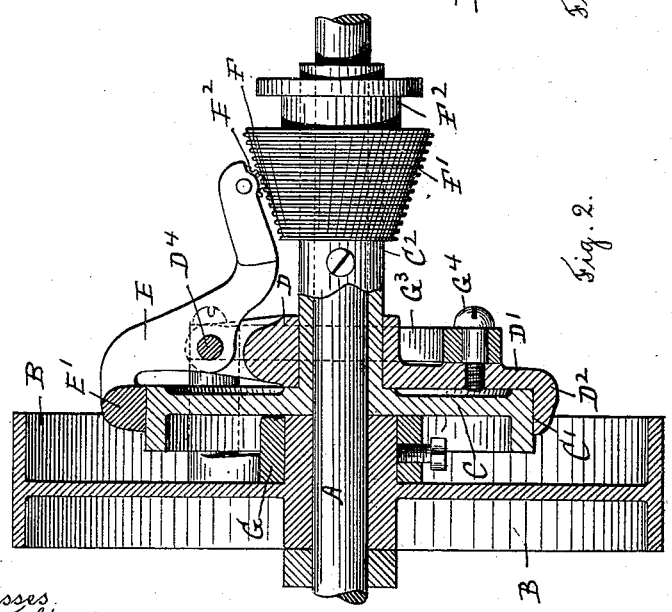

Figure 1 represents a side view of the friction-clutch, the sliding cone having been removed; and Fig. 2 is a view partly shown in section on line 2 2, Fig. 1.

Similar letters refer to similar parts in both figures.

Referring to the drawings, A denotes a shaft, and B a belt-pulley running loosely thereon.

C denotes a disk having a flanged face $C'$ forming a frictional surface, which is seized by the clutching apparatus, as hereinafter described. The disk C is provided with an elongated hub $C^2$, by which the disk C is attached to the shaft A. Turning loosely upon the hub $C^2$ is a collar D, which has a slightly-elongated hole, so as to permit a slight lateral movement of the collar D upon the hub $C^2$. Extending from one side of the collar D is an arm $D'$, provided at its end with a flange $D^2$, concentric with and inclosing a portion of the friction-flange $C'$. Upon the opposite side of the collar D are lugs $D^3$, carrying a pin $D^4$, upon which is pivoted the bent lever E. One end of the lever E is provided with a curved shoe $E'$, resting upon the flange $C'$, and in the opposite end of the lever E is journaled a small pinion $E^2$, provided with teeth adapted to engage the corrugated surface F of a cone $F'$, sliding on the hub $C^2$, and provided with an annular groove $F^2$ to receive the fork of a shipping-lever in the usual and well-known manner. The pulley B is provided with a hub G, to which is attached a collar $G'$, having a radial arm $G^2$ extending a short distance beyond the periphery of the flange $C'$, with its end connected to the arm $D'$ by means of a link $G^3$, pivoted upon the screws $G^4$ $G^4$. The rotary motion of the pulley B carries the arm $G^2$ and connected mechanism, consisting of the collar D, arm $D'$, and friction-flange $D^2$, together with the pivoted lever E and friction-shoe $E'$, the shoe $E'$ and flange $D^2$ sliding over the surface of the friction-flange $C'$ of the disk C, which is connected with a shaft A. When it is desired to impart the rotary motion of the pulley B to the shaft A, the cone $F'$ is moved along the hub $C^2$, so as to raise the outer end of the lever E and bring the shoe $E'$ against the flange $C'$, the pressure of the shoe $E'$ upon the flange $C'$ being applied at the same time through the pin $D^4$ to pull the collar D laterally and bring the flange $D^2$ against the friction-flange $C'$, thereby clamping the flange $C'$ of the disk C between the frictional surface of the flange $D^2$ and shoe $E'$, causing the motion of the pulley B to be imparted to the shaft A. The radial arm $G^2$, attached to the hub G of the pulley B, and the arm $D'$ are so placed relatively that the line of strain between the screws $G^4$, as the arm $D'$ is rotated by the arm $G^2$, will form an acute angle with the arm $D'$, so that the flange $D^2$ will be drawn closely against the flange $C'$ the greater the frictional resistance between them. The cone $F'$ is provided with a series of parallel concentric ribs F, forming teeth engaging the teeth of the pinion $E^2$, the cone forming a rack, along the side of which the pinion $E^2$ rolls as the cone is moved beneath the lever E, thereby causing the cone $F'$ to be held in position when carried beneath the lever E to engage the clutching mechanism. The arm $D'$, collar D, and lugs $D^3$ may consist of a bar extending diametrically across the friction-flange $C'$, inclosing the shaft A, and having one end flanged at $D^2$ to bear against the friction-flange $C'$ and carrying a lever E, provided upon its opposite end. The arm $D'$ can be connected by means of the link $G^3$ directly with the web of the pulley B without the use of the arm $G^2$.

What I claim as my invention, and desire to secure by Letters Patent, is—

1. In a friction-clutch, the combination, with a shaft and a pulley running loosely thereon, of a friction-flange attached concentrically to said shaft, a bar extending diametrically across said friction-flange, with one end arranged to press radially against said friction-flange, a lever pivoted at its opposite end, a friction-shoe carried by said lever and arranged to bear on said friction-flange, and connected actuating mechanism by which said lever is rocked and its shoe carried against the friction-flange, substantially as described.

2. In a friction-clutch, the combination, with a shaft and a pulley running loosely on said shaft, of a friction-flange attached to said shaft, a collar D, inclosing the shaft, an arm D', extending radially from said collar and operatively connected with said pulley, with its free end bearing against the friction-flange, a lever pivoted on the opposite side of said collar, a friction-shoe carried by said lever, and a cone sliding on said shaft by which said lever is actuated, substantially as described.

3. In a friction-clutch, the combination, with a shaft and a pulley running loosely on said shaft, of a friction-flange attached to said shaft, clutching mechanism by which said flange is engaged, a radial arm attached to said pulley, and a pivoted link connection between said radial arm and said clutching mechanism as rotated by said pulley, substantially as described.

4. In a friction-clutch, the combination, with a shaft and a pulley running loosely thereon, of a friction-flange attached to said shaft, a collar inclosing said shaft, an arm projecting radially from said collar, with its free end bearing radially against said friction-flange, and a link placed at an acute angle with said arm by which said arm is operatively connected with said pulley and mechanism connected with said arm, whereby its free end is drawn radially against said friction-flange, substantially as described.

5. In a friction-clutch, the combination, with a shaft, a pulley running loosely on said shaft, a friction-flange attached to said shaft and clutching mechanism applied to said friction-flange and operatively connected with said pulley, said mechanism comprising a pivoted lever, of a pinion carried in the end of said pivoted lever and a sliding cone by which said lever is connected, said cone being provided with a series of parallel concentric ribs forming teeth adapted to engage the teeth of said pinion, substantially as described.

Dated this 9th day of December, 1891.

JOSEPH D. WESTGATE.

Witnesses:
GEO. A. WALKER,
RUFUS B. FOWLER.